United States Patent [19]
Haley

[11] Patent Number: 5,303,811
[45] Date of Patent: Apr. 19, 1994

[54] SPACER SYSTEM FOR SURFACE CONVEYOR

[75] Inventor: Charles T. Haley, Bogart, Ga.

[73] Assignee: Food Machinery Sales, Inc., Athens, Ga.

[21] Appl. No.: 21,779

[22] Filed: Feb. 24, 1993

[51] Int. Cl.⁵ .............................................. B65G 47/29
[52] U.S. Cl. ................................ 198/419.1; 198/463.4
[58] Field of Search ............... 198/418.7, 419.1, 463.4, 198/459, 460

[56] References Cited

U.S. PATENT DOCUMENTS

| | | | |
|---|---|---|---|
| 3,635,638 | 1/1972 | Bryan | 198/463.4 X |
| 4,228,901 | 10/1980 | Watzka et al. | 198/463.4 X |
| 4,231,465 | 11/1980 | Bourgeois | 198/463.4 X |
| 4,296,590 | 10/1981 | Focke | 198/419.1 X |
| 4,298,118 | 11/1981 | Cottrell | 198/419.1 X |
| 4,921,088 | 5/1990 | Ter Horst | 198/419.1 X |

FOREIGN PATENT DOCUMENTS

| | | | |
|---|---|---|---|
| 0002569 | 1/1980 | Japan | 198/419.1 |
| 0161215 | 12/1981 | Japan | 198/419.1 |
| 1519593 | 8/1978 | United Kingdom | 198/419.1 |

*Primary Examiner*—James R. Bidwell
*Attorney, Agent, or Firm*—Hopkins & Thomas

[57] ABSTRACT

A metering device is provided that is able to engage and release food stuff items that are being conveyed on a conveyor belt such that the relative positions of the multiple food stuff items on the conveyor belt are spaced at a predetermined interval. In addition, in a preferred embodiment, the metering device is used in combination with a sensing device that is located upstream of the metering device. The sensing device is able to detect the presence of a food stuff item upstream of the metering device such that the sensing device is able to control the engagement and release of the downstream food stuff items.

17 Claims, 3 Drawing Sheets

SPACER SYSTEM FOR SURFACE CONVEYOR

FIELD OF THE INVENTION

The invention relates to a system for controlling the spacing between a series of work products moving along a surface conveyor. The items being conveyed typically relate to foodstuff products, such as circular cookies or crackers moving in series on one or more surface conveyors, moving from an oven to a packing machine.

BACKGROUND OF THE INVENTION

In order to economically produce and package fragile or delicate work products such as food items, it is desirable to minimize the amount of time it takes to convey an item from its production to its packaging. At the same time, it has also been desirable to maximize the efficiency by which the items are packaged by minimizing packaging errors. If items are inappropriately conveyed from a production station to a packaging station, packaging errors can occur. For example, with cookie-type or cracker-type foodstuffs, it is desirable to bake and transport the cookies on surface conveying systems with several parallel lines of cookies moving through the equipment. When the cookies are ready to be placed in their packages, the equipment typically orients a predetermined number of cookies in an edge-standing stack or "slug" and places the slugs of cookies in recesses of clear plastic cookie trays that become part of the package purchased by the consumer. A cookie tray may comprise several such recesses for receiving several slugs of cookies. If the timing of the delivery of the cookies that are delivered to the packaging station is irregular, the trays might not be properly filled.

The failure to fill the tray with cookies typically is caused by two problems. First, if the foodstuff item, such as a cookie, is not properly aligned or centered in its row on the surface conveyor, it may fall out of its row, or the item may enter into the packaging station out of alignment with the packaging machine and be misfed to the packager. Either mishap is likely to cause the formation of an incomplete slug of cookies and the cookie tray will not be properly filled with cookies. Second, if an individual item is not properly spaced apart from another item along the path of the surface conveyor, maximum packaging speed and efficiency will not be obtained and will likely result in improperly and inefficiently loaded slugs and/or trays. For example, if the items are too close to each other on the surface conveyor, the packaging machine might not be able to accept all of the items. Or if the items are spaced too far apart on the surface conveyor, the packaging machine might not place a full load of the items in the container.

Heretofore, the most common method for correcting packaging errors that were due to the improper way in which cookies were spaced or aligned prior to entering a packaging station was to employ several workers to watch over the forming slugs and trays to remove the trays that were improperly loaded. In the past, if the packaging error was due to a missing item, the usual way to prevent that void from offsetting the entire packaging process was to shut down the conveyor line to correct the void. These correction methods are, of course, expensive and are an inefficient means of conveying and packaging foodstuff items.

In other types of foodstuff industries, attempts have been made to maximize the efficiency of conveying an item from a production station to a packaging station. For example, U.S. Pat. No. 3,429,416 teaches that a plurality of fingers can be used to keep candy bars from fishtailing while the candy bars are being conveyed downstream to a packaging station, and also teaches a separate "hold" or gate/bar mechanism that functions to align the candy bars into columns.

U.S. Pat. Nos. 3,854,569 and 3,970,189 disclose a complex arrangement of a product holder, alignment rail, and a pair of angled thrusting devices. At varying stages in the conveyance stream, the product holder, alignment rail, and the thrusting devices act to align the confection items into rows and columns. However, none of these patents teach adequately aligning and spacing food items such as cookies or crackers on a surface conveyor system and they also fail to teach a means for detecting the absence of an upstream item, and how to adjust the spacing of the downstream item.

SUMMARY OF THE INVENTION

Briefly described, the present invention comprises a method and apparatus for adjusting the spaces between cookies or other duplicate items of comparable size and weight that are being conveyed on a surface conveyor system in parallel paths, such as from an oven, through a cooling system and ultimately to a packaging machine. In the disclosed embodiment, the items being conveyed are duplicate, circular cookies with approximately round perimeter edges, and the cookies are transported on a surface conveyor system having parallel conveyor tapes, all moving at the same rate toward the packaging equipment. However, the principles of the invention can be applied to other types of items and conveyors.

The system, referred to as a metering system, is suspended over all of the lines of cookies and includes a cookie gate for each line of cookies on the surface conveyor system. Each cookie gate functions as a gate to block the movement of the cookies as the cookies travel with the surface conveyor system, and all of the cookie gates usually oscillate in unison toward and away from the conveyor surface to alternately engage and therefore block the movement of the cookies on the conveyor surface and later to release the cookies and allow the cookies to pass on the conveyor surface toward the packaging machine, etc. All of the cookie gates are mounted on a common oscillatory support shaft in such a manner that each individual cookie gate can freely rotate about the support shaft independently of the other cookie gates.

Each cookie gate is supported on the common support shaft in an off-balanced arrangement and tends to tilt downwardly under the influence of gravity toward its surface conveyor line into blocking relationship with respect to a line of cookies moving with the surface conveyor. However, a releasable latch is mounted between the cookie gate and the oscillating drive shaft and normally locks the gate to the drive shaft, causing the gate to oscillate upwardly and downwardly with the drive shaft, away from and then toward blocking relationship with respect to the cookies moving with the surface conveyor system. When the latch of a gate is opened, the gate remains under the influence of gravity in its down, blocking position with respect to the oncoming cookies, while the oscillating shaft and the other gates continue to oscillate.

Each cookie gate includes a pair of fingers which straddle the desired center line of travel of the cookies passing beneath the gate, and the fingers are positioned a distance apart that is less than the diameter of the circular cookies, and the fingers are oscillated toward and away from its line of cookies such that the fingers usually are lowered onto the top trailing portion of a cookie passing there beneath. As the cookie beneath the fingers moves further downstream by the surface conveyor system, the fingers drop off the cookie and down into juxtaposition with the surface conveyor to block the next oncoming cookie. The fingers engage the leading circular edge of the oncoming cookie to retard its downstream movement on the moving surface conveyor. The next oncoming cookies begin to accumulate behind the stopped leading cookie at the cookie gate, so that the cookies form a queue in edge-to-edge abutment. This creates a space between the just released cookie and the cookies blocked at the gate.

The fingers of each cookie gate engage and stop a cookie for a predetermined amount of time during the normal operation of the metering system. The predetermined amount of time is determined by the speed of the surface conveyor system and by a computer that controls the oscillation speed of the oscillating drive shaft.

A cookie sensor means is positioned upstream of the cookie gates and detects the cookies moving toward the gates. If one of the lines of cookies does not have enough cookies to properly form a complete slug of cookies to be moved to the awaiting package, the computer will unlock the latch of that gate so that the gate moves by gravity into blocking relationship with respect to the oncoming cookies. The preceding slug of cookies therefore will be short at least one or possibly several of the cookies to form a complete slug. However, cookies will begin to accumulate at the lowered cookie gate, and the computer will again latch the gate to the drive shaft at the beginning of the formation of the next slug of cookies. Therefore, the next slug of cookies will be formed with the proper number of cookies in the slug.

Inasmuch as the drive shaft normally operates all of the cookie gates in unison, and the surface conveyor system moves all of the cookies at the same rate, the metering system will form slugs of cookies which are equal in number, which are spaced apart equally, and which are aligned both longitudinally and laterally as they move from the metering system toward the packaging machinery.

The drive shaft of the metering system pauses with the gates all in their down, cookie blocking positions for an additional time interval after each slug of cookies has been formed. This causes a gap to be formed between the slugs on the surface conveyor so that the packaging machine has additional time in which to handle the previously formed slug.

Further, when the fingers of each cookie gate move down into juxtaposition with respect to the surface conveyor so as to block the next oncoming cookie, the rounded edges of the cookie tend to cause the cookie to center itself between the fingers of the cookie gate, so that all of the cookies leaving the metering system will be substantially perfectly aligned as they move from the metering system to the packaging machine.

Thus, it is an object of the present invention to provide an inexpensive system for forming multiple lines of cookies with a predetermined number of cookies forming slugs of cookies, and with the spaces between the cookies in a slug being substantially equal.

Another object of the present invention is to provide a method and apparatus for aligning duplicate items into rows and columns on a surface conveyor system.

It is a further object of the invention to provide an improved method and apparatus for delivering the proper number of items to a packaging machine from each row of a multiple row conveyor system.

It is another object of the invention to provide a system for controlling the spacing of items moving in parallel lines on a surface conveyor system, so as to place a predetermined number of the items in each line equidistant from one another so as to form a slug of the items in each line that will be received in a container, and then to form a larger gap between the slugs of items, so that the slugs can be received in a container and move with the container out of the way of the next oncoming slug.

Other objects, features and advantages of the present invention will become apparent upon reading the following specification, when taken in conjunction with the accompanying drawings.

DETAILED DESCRIPTION

Figure 1:
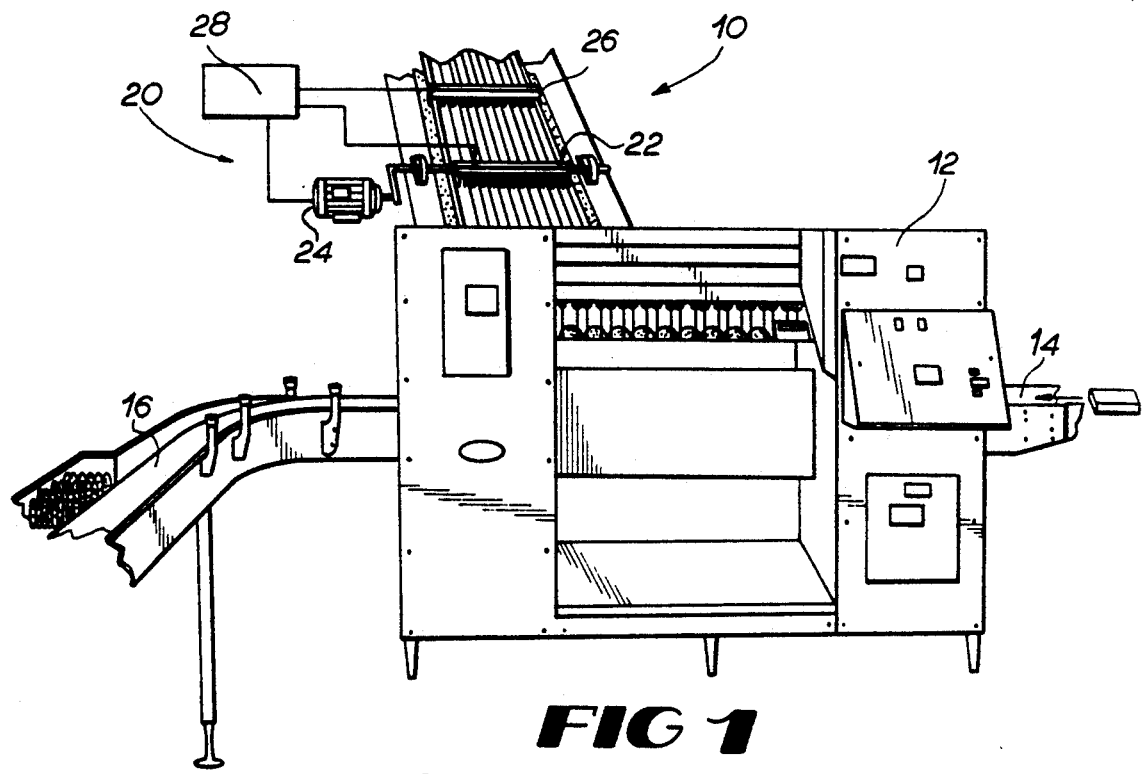
FIG. 1 is a perspective illustration of a cookie packaging machine and the delivery conveyor system for delivering cookies to the machine.

Referring now in more detail to the drawings, in which like numerals indicate like parts throughout the several views, FIG. 1 illustrates a surface conveyor system 10 that delivers cookies to a packing machine 12. The packing machine is of conventional construction and includes a tray conveyor 14 which delivers cookie trays laterally across the delivery end of the surface conveyor system 10. The cookies are arranged in slugs, and the slugs of cookies are delivered to the cavities of the trays. The filled cookie trays are delivered by the delivery end 16 of the tray conveyor to the next operating station (not shown) where the filled cookie trays are placed in bags.

Metering system 20 is positioned upstream of the cookie packaging machine 12 on the surface conveyor system 10. Generally, metering system 20 includes gate assembly 22, drive motor 24, cookie detector system 26 and computer 28. Gate assembly 22 and cookie detector system 26 are both suspended over the surface conveyor system 10, allowing the cookies to pass there beneath.

Figure 2:
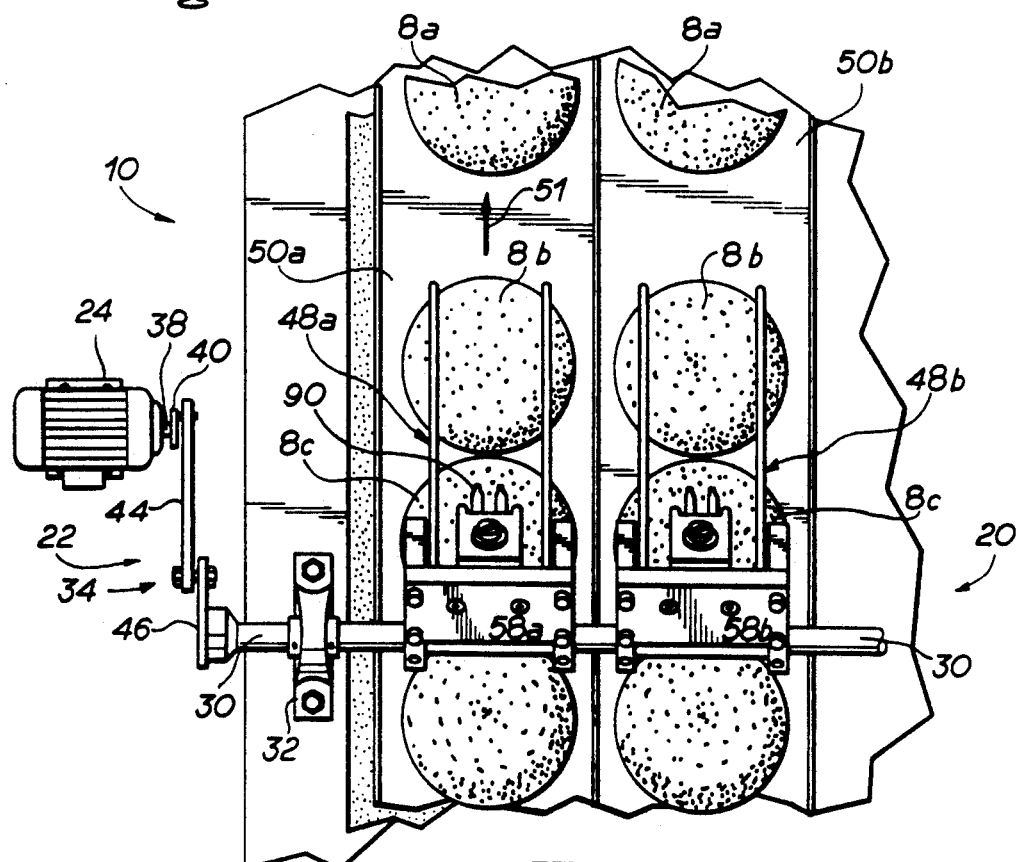
FIG. 2 is a plan view of a portion of a surface conveyor system and the metering system of this invention.

As illustrated in FIG. 2, gate assembly 22 comprises drive shaft 30 that extends across and over the surface conveyor system 10, with the drive shaft being supported at its opposite ends in bearings 32. Drive shaft 30 is connected at one of its ends through intermediate crank linkage 34 to motor 24. The drive shaft 38 of motor 24 rotates crank 40, and intermediate link 44 oscillates follower link 46 which oscillates drive shaft 30.

Figure 3:
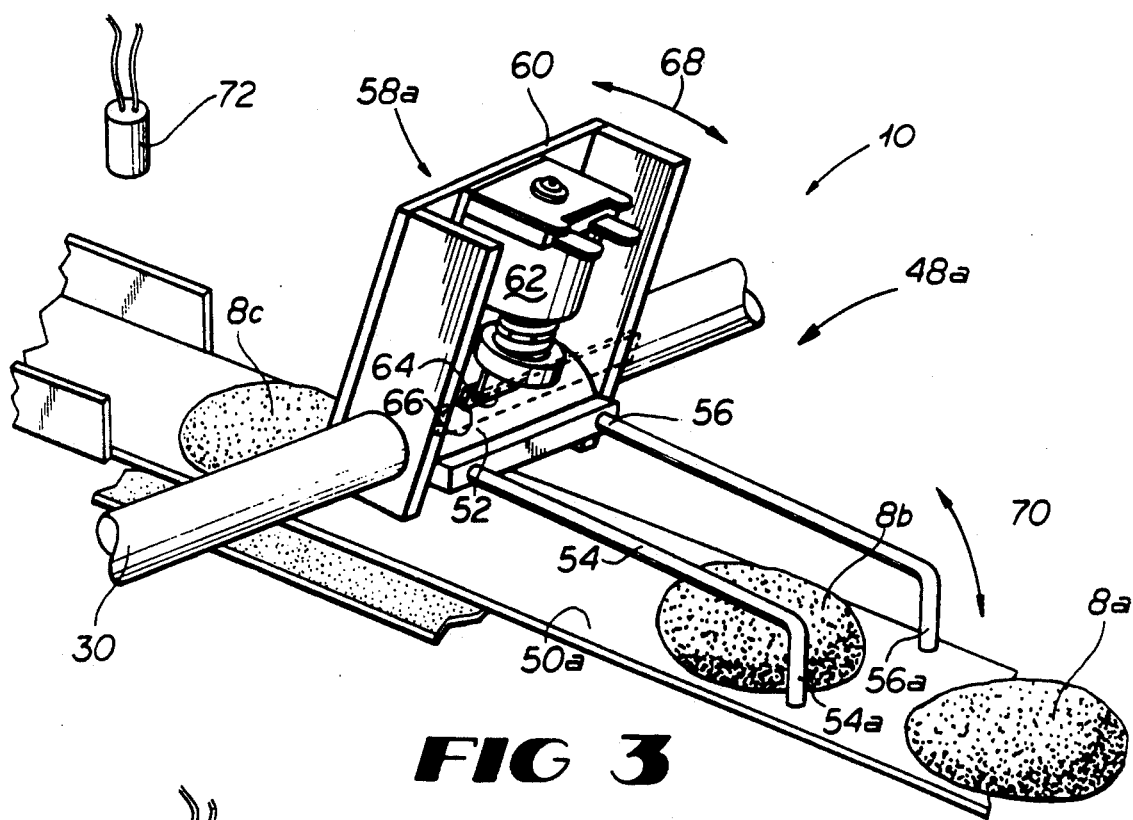
FIGS. 3 and 4 are perspective, detailed illustrations of the metering system, showing in FIG. 3 one of the cookie gates as it oscillates with the drive shaft, and showing in FIG. 4 the cookie gate as it has been released and is allowed to move down into juxtaposition with respect to the surface conveyor system to block the oncoming cookie.

A plurality of duplicate cookie gates are freely rotatably mounted to drive shaft 30. As illustrated in FIG. 2, cookie gate 48a is mounted to drive shaft 30 and is positioned over the line of cookies moved on surface conveyor tape 50a in the direction indicated by arrow 51. Likewise, cookie gate 48b is mounted over cookie conveyor tape 50b. As shown in FIG. 3, each cookie gate includes a sleeve 52 and a pair of fingers 54 and 56 are each mounted at one end to the sleeve and extend parallel to each other and in the direction of movement of the surface conveyor system from the sleeve, with the end portions 54a and 56a being angled downwardly toward conveyor tape 50a.

Each cookie gate includes a cookie gate latch assembly. For example, cookie gate 48a includes latch assembly 58a which includes a housing 60 rigidly mounted to the drive shaft 30, a solenoid mounted to the housing, and a latch 64 operated by the solenoid 62. A slot or protrusion 66 is formed on sleeve 52 for engaging the latch 64. With this arrangement, when drive shaft 30 is oscillated by motor 24 and its crank linkage 34, the cookie gate latch assembly, such as latch assemblies 58a and 58b, will oscillate as indicated by doubled-headed arrow 68. When latch 64 is projected in front of its protrusion 66, the cookie gate, such as cookie gate 48a, will move upwardly in unison with the drive shaft, as indicated by arrow 70. Thus, all of the cookie gates, 48a, 48b, etc. will move upwardly in unison. However, when solenoid 62 is energized to retract latch 64 from its protrusion 66 of its sleeve 52, the latch assembly 58a will continue to oscillate in unison with the drive shaft as indicated by arrow 68, but the sleeve 52 of the cookie gate will not be locked to the drive shaft 30, leaving the cookie gate without power to oscillate. Inasmuch as the fingers 54 and 56 of each cookie gate cause the cookie gate to be mounted in an off-balance relationship about drive shaft 30, the unlocked cookie gate will tend to move under the influence of gravity in a downward direction so that the end portions 54a and 56a, for example, will fall toward engagement with the conveyor tape 50a, so that the ends of the fingers are in contact, or at least juxtaposed against the upper surface of the conveyor tape.

When the cookie gate is to be reconnected to drive shaft 30, the solenoid 62 is de-energized, causing its spring to thrust its latch 64 toward locking engagement in front of protrusion 66 of sleeve 52, so that the cookie gate now resumes oscillation with drive shaft 30.

Cookie detector system 26 of FIG. 1 comprises a detector, such as a photocell 72 (FIG. 5) for each line of cookies. Each photocell 72 detects therebeneath a cookie moving on the surface conveyor system. The detection of each photocell is communicated to computer 28, and the computer utilizes this information to control the cookie gate latch assembly of each cookie gate.

OPERATION

Separate lines of cookies move on the surface conveyor system 30 beneath the cookie detector system 26 and beneath the gate assembly 22 toward the packaging machine 12, where the cookies are placed in trays, and the trays are conveyed away to be placed in bags.

The cookies are to be arranged on the surface conveyor in groups or "slugs" of a predetermined number of cookies so that when the slugs of cookies reach the packaging machine 12, the cavities of the cookie trays will be properly filled with cookies.

Figure 4:
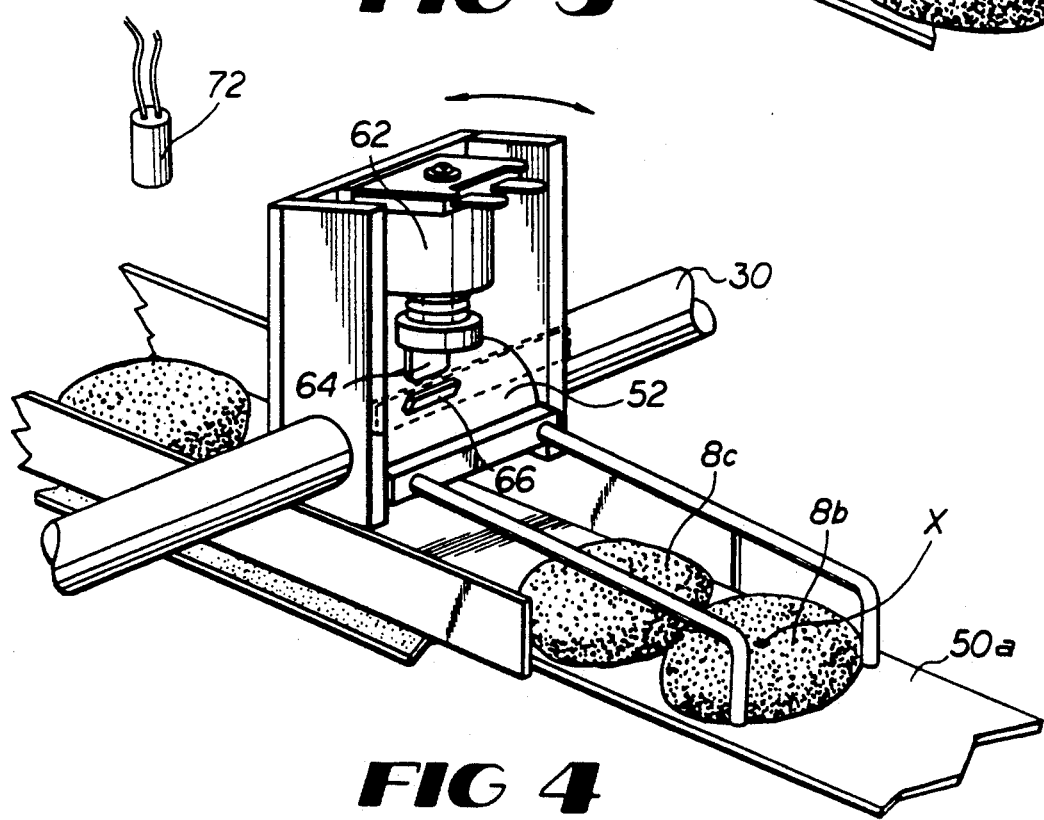
Figure 5:
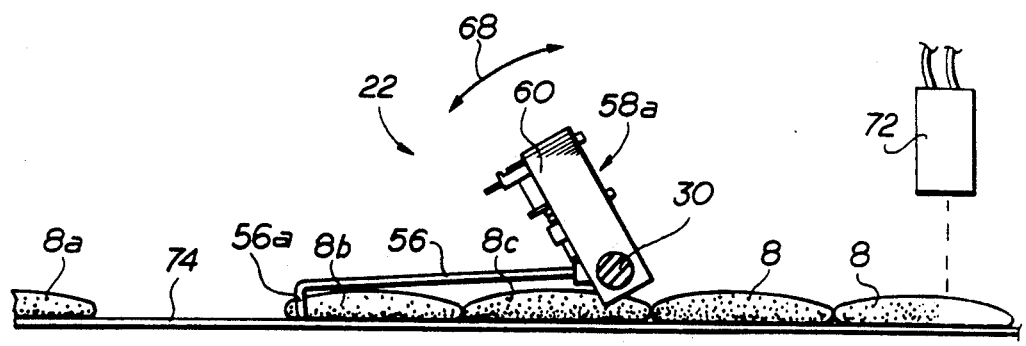
FIGS. 5, 6, and 7 show a side elevational view of a cookie gate in its operative positions, with FIG. 5 showing the cookie gate in its down position where it blocks the oncoming cookies, FIG. 6 showing the cookie gate as it is lifted away and releases the previously blocked cookie, and FIG. 7 showing the cookie gate as it begins to move down toward its blocking position.

When all of the cookie gates 48 are locked to the drive shaft 30, the cookie gates will move upwardly away from the surface conveyor system in unison with the oscillating drive shaft. When the cookie gates oscillate so that their fingers move down into juxtaposition with respect to the surface conveyor passing therebeneath, the fingers will block the next oncoming cookie. For example, FIGS. 4 and 5 illustrate the fingers moved down against the surface conveyor and blocking the movement of the oncoming cookie 8b. The previous cookie 8a which passed beneath the cookie gate before the cookie gate moved into blocking relationship now continues to move with the surface conveyor away from the blocked cookies 8b, 8c, etc. In the meantime, the other oncoming cookies 8c, etc. begin to accumulate in edge-to-edge abutment with previously blocked cookies to form a queue of cookies at the cookie gate.

When a new slug of cookies is to be formed by the metering system, the drive shaft 30 will pause with all of its cookie gates in their down positions, so as to form a gap 74 behind the last cookie of the previous slug of cookies and in front of the first cookie 8b that will be in the next slug of cookies. Since all of the gates will be in their down positions, gaps 74 will be formed in all of the lines of cookies on the surface conveyor system.

Figure 6:
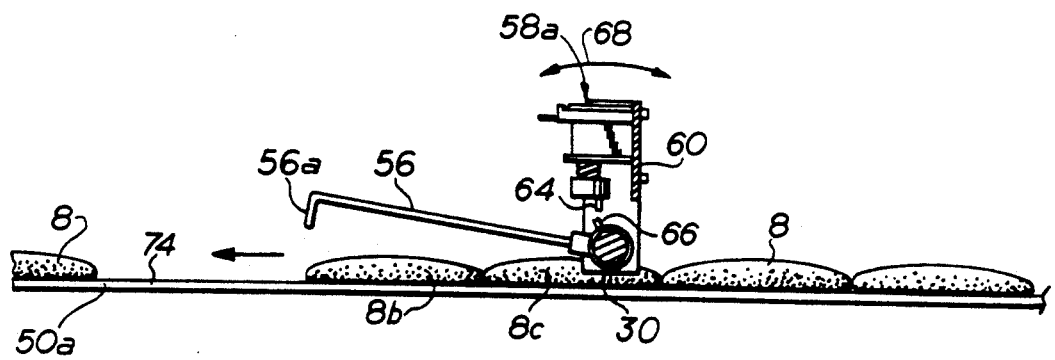
Figure 7:
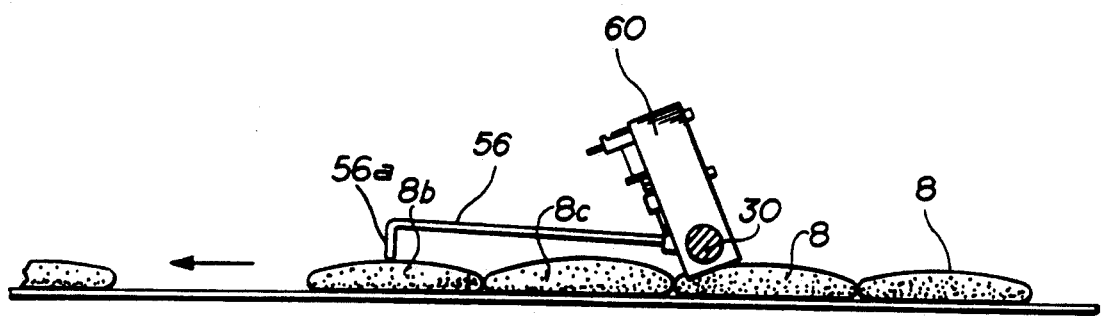

Once the proper gap 74 has been established in each line of cookies, the drive shaft 30 will begin its normal, more rapid oscillations. The gates 48a, 48b, etc. will then be raised and lowered so as to control the spaces to be formed between the cookies. FIG. 6 shows a cookie gate being lifted so as to move out of blocking relationship with respect to the oncoming cookie, therefore releasing the cookie immediately beneath the fingers. FIG. 7 illustrates the gate assembly tilting back in the opposite direction so that its gate fingers move back toward the surface conveyor system. If the cookie 8b has not yet cleared the fingers, the fingers simply lightly engage the top surface of the cookie 8b and allow that cookie to continue its movement with the surface conveyor system. However, the cookie 8b eventually moves out from beneath the fingers of the cookie gate and the fingers then drop off the trailing edge of the cookie, into blocking relationship with respect to the next oncoming cookie. Thus, the next cookie, 8c, is temporarily blocked until a space of a predetermined size is created between these two cookies.

Because the latch 64 of each gate is in front of the protrusion 66, the tilting of the latch assemblies back to the down position does not force the gates downwardly, thereby allowing gravity to bias the gates toward the down, blocking positions. This avoids damage to the cookies when the gates engage the tops of the cookies, as shown in FIG. 7.

This motion continues until all of the cookies in the slug passing beneath the cookie gate have been properly spaced. When the last of the predetermined number of cookies has been released by the gates, the gates will be moved back down into blocking relationship with the oncoming cookies for an extra interval of time, so as to create the gap 74 between the just released slug of cookies and the next oncoming slug of cookies.

In a situation where one of the lines of cookies does not receive enough oncoming cookies to properly form a slug of cookies having a predetermined number of cookies, the photocell 72 of that line of cookies will detect the absence of sufficient numbers of cookies, and this information will be communicated to the computer 28. Upon receiving this information, the computer will energize the solenoid latch of the cookie gate latch assembly 58 of that line of cookies, which allows the cookie gate to fall under its own weight into blocking relationship with respect to the oncoming cookies. Even though the drive shaft 30 continues to oscillate, the line of cookies that is deficient in number will be blocked until enough cookies have been moved into the cookie gate, and until the beginning of the next slug commences. In other words, the preceding slug will be allowed to progress without having enough cookies to completely fill the slug, but the next oncoming slug will be properly filled with cookies. This operation increases the likelihood that the succeeding slugs of cookies will be fully filled with cookies.

While the surface conveyor system has been disclosed as a series of conveyor tapes moving in parallel so as to move the lines of cookies in parallel, it will be understood by those skilled in the art that a single, broad surface conveyor could be used instead. Further, while the cookie sensing means has been described as being a plurality of photocells 72, with each photocell positioned over a line of cookies, it should be understood that other types of sensing means can be used.

When the metering system is used with circular items, such as cookies having a round perimeter, it will be appreciated that the distal ends of the cookie gates, such as the downwardly turned ends 54a and 56a of cookie gate 48a, are spaced apart across the center line of movement of cookies, so that the rounded edge of the cookie at the gate will engage the spread apart fingers. If the center of gravity X (FIG. 4) of the cookie to engage the finger ends of the gate is generally beneath the fingers, when the leading rounded edge of the cookie engages one finger end, the conveyor tends to pivot the cookie so that its leading edge also engages the other finger end. This action between the surface conveyor, cookie and finger ends and the rounded cookies always causes the cookie blocked by the fingers to be centered at the gate. Therefore, a substantially perfect line of cookies will be released by each cookie gate.

Inasmuch as all of the cookie gates are operatively mounted to the oscillating drive shaft 30, they operate in unison and release cookies in unison. This means that the cookies also will be laterally aligned as well as longitudinally aligned as they approach the cookie packaging machine.

While the foregoing specification and drawings have disclosed the preferred embodiment of the invention, it will be understood by those skilled in the art that variations and modifications thereof can be made without departing from the spirit and scope of the invention as set forth in the following claims.

I claim:

1. A metering system for controlling the spaces between cookies moving along a surface conveyor means in parallel lines comprising:

movable gate members positioned over each line of cookies on the surface conveyor means for moving into and out of blocking relationship with a line of cookies moving along the conveyor, said gate members each including fingers spaced laterally across a centerline of movement of the cookies for moving between adjacent ones of the cookies so that when a leading edge of an oncoming cookie engages a finger, the oncoming cookie tends to pivot against said finger into engagement with another finger to cause the cookie to be centered between the fingers, means for moving all of said gate members in unison into and out of blocking relationship with all of the lines of cookies to retard the movements of the cookies and to form equal spaces between the cookies and to laterally align the cookies of each line of cookies until a slug of a predetermined number of cookies have been substantially equally spaced in each line of cookies, and for forming gaps between the slugs of cookies which are larger than the spaces between the cookies, sensing means positioned upstream of said gate members for detecting the presence of cookies moving in each line of cookies with surface conveyor means toward said gate members, and control means responsive to the detection by said sensing means of less than a predetermined number of cookies moving in a line of cookies along the surface conveyor toward one of said gate members for moving one of said gate members into blocking relationship with respect to its line of cookies until several cookies have become blocked in edge-to-edge relationship with one another at said one gate member.

2. The metering system of claim 1 and wherein said control means includes:

means for maintaining a gate member in blocking relationship with its line of cookies until the other gate members begin to form a slug of cookies.

3. The metering system of claim 1 and further including:

a drive shaft extending over and across the lines of cookies, drive means for oscillating said drive shaft, said movable gate members all being rotatably mounted on said drive shaft with each gate member positioned over a line of cookies, means for biasing each of said gate members toward blocking relationship with a line of cookies, each of said gate members including latch means for releasably locking its gate members to said drive shaft so that the gate means oscillate with said drive shaft alternately into and out of blocking relationship with a line of cookies, said latch means being responsive to said control means for unlocking its gate member to said drive shaft so that the gate member moves by said means for biasing into blocking relationship with its line of cookies until said latch means later locks the gate member to said drive shaft.

4. The metering system of claim 3 and wherein said means for biasing each of said gate members toward blocking relationship with a line of cookies comprises mounting each gate member in an off balance arrangement on said drive shaft so that the gate members are induced by gravity to move toward blocking relationship with their lines of cookies.

5. The metering system of claim 3 and wherein said latch means of each gate member comprises a solenoid actuated latch carried by said drive shaft and a spacer fork rotatably mounted to said drive shaft with a keeper mounted to said spacer fork for engagement by said latch.

6. The metering system of claim 5 and wherein said spacer fork includes a pair of fingers laterally spaced across a line of cookies for engaging the leading edges of the cookies, so that the movement of a round edge cookie against the fingers tends to cause the cookie to center itself between the fingers.

7. The metering system of claim 1 and wherein said movable gate members each include means for centering the cookies in a line of cookies in response to movement of a cookie into engagement with said gate means.

8. A spacer system for controlling the positions of items travelling in series and in a plurality of parallel paths of a surface conveyor system comprising:
 a drive shaft for extending over and across the parallel paths of the surface conveyor system,
 drive means for oscillating said drive shaft,
 a plurality of gate means all rotatably mounted on said drive shaft with each gate means positioned over and urged toward a path of the surface conveyor system into blocking relationship with the items moved by the conveyor system along the path,
 each of said gate means including latch means for releasably locking its gate means to said drive shaft so that the gate means oscillates with said shaft alternately downwardly toward the surface conveyor system into blocking relationship with the items moving on the surface conveyor system to stop the movement of the items and upwardly away from the surface conveyor system out of blocking relationship with the items moving on the surface conveyor system to allow the items to move with the surface conveyor system,
 control means for detecting the presence of items moving along each path on the surface conveyor system toward each gate means and for actuating the latch means of a gate means of a path in which a deficient supply of items moves toward the gate means so that the gate means blocks the movement of items along its path until a sufficient supply of items moves toward the gate means.

9. The spacer system of claim 8 and wherein the items travelling on the surface conveyor system have rounded side edges, and wherein said gate means comprises a pair of spaced fingers movable downwardly into straddling relationship in front of the oncoming items moving along the path of said gate means so that the engagement by rounded edges of the oncoming items against the spaced fingers tends to center the items with respect to the gate means.

10. The spacer system of claim 8 and wherein each of said gate means is mounted in an off balance relationship on said drive shaft and urged by gravity toward a path of the surface conveyor system into blocking relationship with the items moved by the conveyor system along the path.

11. The spacer system of claim 8 and wherein said control means comprises means for delaying the movement of one of said gate means upwardly away from the surface conveyor system out of blocking relationship with the items moving on the surface conveyor system until a plurality of items are in edge-to-edge abutment with one another at said one gate means.

12. A method of adjusting the spaces between adjacent items travelling in aligned series on a moving surface conveyor comprising the steps of:
 (a) moving a pair of downwardly protruding fingers into a straddling, confronting relationship with the line of items in spaces between the items to engage the leading edges of the items and stopping the movement of a first one of the items which is to form a slug of items on the moving surface conveyor and increasing the space between the first item of the slug and the last item ahead of the first item of the slug;
 (b) while the first item of the slug is stopped at the gate, accumulating on the moving surface conveyor at least some of the succeeding items of the slug in sequence behind the first item in edge-to-edge relationship with the preceding stopped items;
 (c) after a space of predetermined distance has been formed between the first item of the slug and the last item ahead of the first item of the slug, moving the pair of fingers upwardly and releasing the first item of the slug from the fingers to permit the first item to move with the conveyor beyond the fingers;
 (d) as the first item of the slug continues its movement on the conveyor, moving the pair of fingers downwardly into engagement with the edges of the succeeding item and stopping the movement of the succeeding item of the slug with the fingers until the first item of the slug travels a predetermined distance from the succeeding item of the slug;
 (e) when the first item of the slug has travelled the predetermined distance from the succeeding item of the slug, releasing the succeeding item of the slug at the fingers;
 (f) repeating step (e) for the next succeeding items of the slug until all of the items of the slug have become substantially equally spaced on the conveyor and;
 (g) centering each item on the surface conveyor as it is straddled by the fingers.

13. The method of claim 12 and wherein the surface conveyor continues to operate at a substantially constant velocity as the adjacent items are stopped and released.

14. The method of claim 12 and wherein the step of stopping the movement of the succeeding products comprises moving the fingers toward its position to stop the succeeding items before the first item has cleared the fingers.

15. A method of spacing disc-shaped products travelling in series on a moving surface conveyor for loading into a packing receptacle, comprising the steps of:
 advancing parallel lines of the products toward a packing receptacle,
 as the lines of products are advanced, moving a pair of spaced fingers into each line of products between adjacent products in a confronting, straddling relationship with respect to the areas of contact of abutting products in each line of products,
 blocking the movement of one of the products on the surface conveyor until a plurality of products form a queue of abutting products behind the blocked product, releasing the products one at a time from the queue of abutting products to allow each released product to continue movement with the surface conveyor, and depositing each released product in series in the packing receptacle.

16. The method of claim 15 and wherein the step of blocking the movement of one of the products comprises moving the fingers into engagement with the lines of products in spaces at the areas of contact between abutting products of the line of products to block the movement of succeeding products before the preceding product has cleared the fingers.

17. The method of claim 15 and further including the step of centering each product on the surface conveyor as it is engaged by the fingers.

* * * * *